United States Patent [19]

Gray

[11] 4,066,891

[45] Jan. 3, 1978

[54] GEOCHEMICAL AND GEOPHYSICAL EXPLORATION

[75] Inventor: Peter R. Gray, Bartlesville, Okla.

[73] Assignee: Phillips Petroleum Company, Bartlesville, Okla.

[21] Appl. No.: 712,297

[22] Filed: Aug. 6, 1976

[51] Int. Cl.$^2$ ............................................. G01V 5/00
[52] U.S. Cl. ................................... 250/253; 250/255; 23/230.3
[58] Field of Search ............................ 250/253, 255; 23/230 EP, 230.3

[56] References Cited

U.S. PATENT DOCUMENTS

| 2,551,449 | 5/1951 | Menke | 250/255 |
| 3,968,371 | 7/1976 | Greendale | 250/255 |

OTHER PUBLICATIONS

Blanchard, R. L., Analytical Chemistry, vol. 38, No. 2, Feb. 1966, pp. 189–192.

Primary Examiner—Archie R. Borchelt

[57] ABSTRACT

Valuable information on the presence or absence of uranium-enriched ores, geothermal reservoirs, or natural gas sources is obtained by analyzing earth samples for their relative Po210 content.

7 Claims, No Drawings

GEOCHEMICAL AND GEOPHYSICAL EXPLORATION

This invention relates to geochemical and geophysical exploration. More specifically the invention relates to a process for the prospecting for uranium ores, for geothermal reservoirs or for natural gas sources by analyzing earth samples for specific constituents.

BACKGROUND OF THE INVENTION

It is well known in the art to analyze soil samples for their helium content. Furthermore, it is known in the art to determine the ratio of radon/helium content of such samples. These methods are all fairly rough and inaccurate and have the disadvantage of analyzing measuring the concentration of gaseous ingredients. It would, therefore, be desirable to have a geochemical and geophysical method available by which an accurate determination of an element could be carried out that is indicative for uranium concentrations and can be used to determine changes in uranium concentrations in underground formation features that simulate changes in uranium concentrations. Such a process would constitute a valuable tool in connection with other primarily geophysical data to determine the presence and absence of, e.g., uranium-enriched ores, of geothermal reservoirs, or of natural gas sources.

THE INVENTION

It is thus one object of the invention to provide a novel prospecting method.

A further object of this invention is to provide a method for a determination of uranium concentrations and changes of uranium concentrations in underground formations.

Another object of this invention is to provide a method by which uranium concentrations, changes of uranium concentrations or formation features that simulate changes in uranium concentrations can be determined at the surface of the earth in a relatively inexpensive way and with a high degree of accuracy.

Yet another object of this invention is to provide a method for detecting uranium-enriched ores, geothermal reservoirs or natural gas sources by geochemical methods.

These and other objects, advantages, details, features and embodiments of this invention will become apparent to those skilled in the art from the following detailed description of the invention, the example and the appended claims.

I have now found that analyzing earth samples for their Po210 concentration is an efficient way of determining the presence of subterranean uranium-enriched ores, or geothermal reservoirs, or natural gas sources.

In accordance with this invention there is provided a process which comprises procuring earth samples and analyzing them for their polonium 210 content.

Generally speaking, earth samples in accordance with this invention are obtained from various locations and are individually analyzed for their polonium-210, symbol Po210, concentration.

The results of this analysis constitute a valuable tool which, together with other geophysical information, enables a prospector to locate, e.g., uranium-enriched ores, or geothermal reservoirs or natural gas sources. It is particularly advantageous to convert the results obtained by sample analysis into a Po210 profile. The location of increased Po210 concentration is related to the underground location of other uranium-enriched ore, or a geothermal reservoir or a natural gas source.

The physical mechanism on which this invention is based is the radioactive decay of uranium (U238). This decay progresses through various elements finally ending with the stable lead (Pb206). Among the various elements of this decay series, only radon (Rn222) is a gas. The Rn222 diffuses through the formation to the surface. For this reason Rn222 has been used for environmental analysis, e.g., in uranium mines. Rn222 decays further and in its decay series one stage is Po210. This Po210 is a solid material under normal temperature and pressure conditions and does not to any substantial extent leave the formation once it is formed. The Po210 is an alpha emitter and has a half-life of about 138 days. Since U238 has an extremely long half-life time as compared to all the following decay elements thereof, a uranium ore can be envisaged as a producer of Rn222 gas for the practical purposes of this invention at a constant rate.

Rn222 in turn decays with a half-life of about 3.8 days into polonium 218 (Po218), a solid material under normal temperature and pressure conditions. This element Po218 in turn decays and becomes via a series of short-lived intermediates, lead 210 (Pb210) with a half-life of 22 years, which decays via bismuth 210 (Bi210) (5 days half-life) to Po210. The half-life time of Po210 of 138 days is on the one hand sufficiently long that earth samples can be taken and efficiently be analyzed and at the same time the alpha activity is sufficiently high since the half-life time is not too long so that meaningful and accurate results can be obtained.

Although Rn222 has a rather short half-life of 3.8 days, it diffuses to the surface to some extent. Thus earth samples at the earth surface can be analyzed for Po210 to obtain a valuable information on the eventual presence of the specific subterranean formations mentioned above. Preferably, however, and in accordance with one embodiment of this invention, the earth samples are not taken from the surface but are taken from a layer which is about 2 inches to about 5 feet below the earth surface. Thereby interferences with radon diffusion through the atmosphere and correspondingly depositions of Po210 from this interfering radon gas are effectively avoided. At the same time a meaningful information on the nature and composition of the earth far below the sampling location is obtained in a fairly inexpensive and reliable manner.

The present invention is mainly applicable to locate uranium-enriched ores. Uranium is an element that is very widely spread across the earth. Whether mining of uranium-containing ores is economical depends primarily on the uranium concentration. These uranium concentrations in various parts of the United States range from about 0.1 to 0.4% $U_3O_8$ in the uranium-containing ore. At a uranium price of $20 per pound of $U_3O_8$ and under normal mining conditions, the uranium concentration would have to be above 0.15% $U_3O_8$ uranium-containing ore to render mining of such ores economical. Generally, uranium ores mined today have concentrations in the range of about 0.1 to 0.30% $U_3O_8$ in the uranium-containing ore.

The present invention is, however, also applicable to locate geothermal reservoirs. The high temperature of such reservoirs increases the speed of diffusion of the gaseous Rn222 and thus also results in a net increase of Po210 in those earth samples into which this heated Rn222 diffused as compared to those earth samples not influenced by the geothermal reservoir. Whether one would expect uranium-enriched ores or geothermal sources related to the Po210 rich samples depends upon further geophysical informations such as strata age, history, structure, depth and general knowledge on the composition, etc.

Similarly, natural gas sources may cause Rn222 to diffuse faster to the surface through a porous formation than in the surrounding portions of the formation being either not porous at all or being less porous than the natural gas-containing formation. Therefore, the determination of Po210 concentrations can also be indicative of subterranean gas sources.

The results of the Po210 analysis of the earth samples from different geographical locations are recorded and the relative abundance of Po210 in correlation with the geographical location from where the sample was taken is utilized as an indicator for anomalies, e.g., uranium concentrations. Utilizing these data and eventually further geophysical information one or more locations for drilling operations are determined.

The process of analyzing the samples for their Po210 content can be carried out in various manners. Preferred features of the analyzing process constituting preferred embodiments of this invention are contained in the following description of an analysis procedure that has successfully been practiced in the laboratory.

Samples of 20 gms of the rock or soil are digested in 4N HCl for about 4 hours at a temperature in the range of about 70°–90° C while stirring. The digested samples then are filtered. The filtrate contains dissolved polonium. This filtrate is evaporated to near dryness and brought back up to 200 ml with 1N HCl. The obtained solution is then divided into two equal 100 ml portions. A reducing agent, e.g., about 7.5 gm hydrazine hydrochloride or about 5 gm ascorbic acid is added to each of these 100 ml aliquots. The reducing agent is added to eliminate the interference of iron in the following plating step by reducing the iron to the ferrous state. Then 50 microliters of a standard polonium solution containing a nominal 1.4 millimicrocuries (1 millimicrocurie = $10^{-9}$ curies) of polonium is added to one of the 100 ml aliquots. Then a silver planchet is submerged into each of the two solutions that are kept at a temperature of about 90° C for 4 hours while stirring. The silver planchets thereafter are withdrawn from the solution and the alpha activity of these planchets is determined in a suitable alpha proportional accounting system. The concentration of polonium in the aliquot to which the standard polonium solution has been added is several magnitudes higher than the polonium concentration of the other 100 ml aliquot. Therefore, the concentration of Po210 is linearly related to the known concentration by the ratio of the counted alpha decays.

The advantage of using a silver planchet is that only the Po210, not the Pb210 or Bi210, is deposited. Therefore, the results are not affected by increases of Pb210 or Bi210 activity on the planchet. Po210 is counted with very high sensitivity and with very low background.

The efficiency of the plating step just mentioned averages about 91% when using the hydrazine and about 86% when using ascorbic acid as the reducing agent. The polonium concentrations in the samples analyzed can vary from, e.g., 8–90 picocuries (1 picocurie = $10^{-12}$ curie) on the basis of a 100 gm soil or rock sample. Since the detection limit for this method presently is about 0.1 picocuries per sample, the sensitivity for polonium is about $2.3 \times 10^{-19}$ grams per gram of soil or rock sample. The analysis results obtained generally are plotted on a map representing the area from which the samples were taken and show a Po210 profile similar to an elevation profile. Higher Po210 concentrations relate to, e.g., higher uranium concentrations in a subterranean ore, or to the presence of a geothermal reservoir.

A typical example for the results obtained by the process of this invention is given in the following.

EXAMPLE

Twenty-gram samples of earth, each from various locations within an area in New Mexico, were taken from about 1 foot below the earth surface. These samples were treated as described above and the alpha activity of the silver planchets was determined by means of a standard alpha counting device. The results obtained for these samples are shown in the following table.

TABLE

| Sample No. | 1 | 2 | 3 | 4 | 5 | 6 | 7 |
|---|---|---|---|---|---|---|---|
| Alpha activity[1] (Counts per 30 minutes) | 43 | 47 | 68 | 83 | 108 | 105 | 73 |
| Po210 concentration[2] (Picocurie/100g) | 3 | 14 | 21 | 25 | 33 | 32 | 22 |

[1] Proportional-counter converter, Model PCC-11TC, manufactured by Nuclear Measurements Corp., 2470 N. Arlington and Kigley, Indianapolis, Indiana 46218
[2] Not corrected for the time lapse between sampling and measuring.

Reasonable variations and modifications which will become apparent to those skilled in the art can be made in this invention without departing from the spirit and scope thereof.

It is claimed:

1. A process of prospecting for subterranean formations comprising
   a. procuring earth samples from the earth at a depth of about 2 inches to about 5 feet below the earth surface, and
   b. determining the Po210 concentration of these samples.

2. A process in accordance with claim 1 wherein the earth samples are procured from various spots distributed in a pattern over an area prospected and wherein the Po210 concentration of each one of these samples is determined by measuring the Po210 caused alpha activity of these samples.

3. A process in accordance with claim 1 wherein said samples are analyzed for their Po210 concentration by
   a. acid digestion of said sample;
   b. producing a Po210 solution from said digested sample;
   c. self plating of Po210 from said Po210 solution onto a carrier, and
   d. determining the alpha activity of the Po210 on said carrier.

4. A process in accordance with claim 3 wherein said step (a) is carried out by digesting samples in hydrochloric acid.

5. A process in accordance with claim 3 wherein said step (c) is carried out by letting the Po210 be self-deposited from said Po210 solution onto a silver surface as said carrier.

6. A process in accordance with claim 3 wherein said sample is digested in aqueous hydrochloric acid to produce the first sample solution, wherein said first sample solution is filtered to produce a filtrate and a residue, wherein the filtrate is evaporated to produce a dry or nearly dry material, wherein said material is dissolved in agueous hydrochloric acid to produce a second sample solution, wherein said second sample solution is treated with a reducing agent to reduce any trivalent iron in said second solution to at least divalent iron resulting in a reduced second sample solution, and wherein a silver carrier is submerged in said reduced second sample solution for a predetermined period of time to obtain a silver carrier containing Po210 self-plated thereon, and wherein the alpha particles emitted by said silver carrier containing the Po210 self-plated thereon are counted.

7. A process in accordance with claim 1 wherein the results obtained are converted into a Po210 profile showing the changes of Po210 concentration across a geographical area explored.

* * * * *